(No Model.)

E. THOMSON.
METER FOR RECORDING MEASUREMENTS OF ELECTRIC POWER.

No. 521,684. Patented June 19, 1894.

WITNESSES
a. F. Macdonald.
E. F. McAdams.

INVENTOR
Elihu Thomson
by Bentley & Blodgett
Attys.

UNITED STATES PATENT OFFICE.

ELIHU THOMSON, OF SWAMPSCOTT, ASSIGNOR TO THE GENERAL ELECTRIC COMPANY, OF BOSTON, MASSACHUSETTS.

METER FOR RECORDING MEASUREMENTS OF ELECTRIC POWER.

SPECIFICATION forming part of Letters Patent No. 521,684, dated June 19, 1894.

Application filed January 31, 1894. Serial No. 498,594. (No model.)

*To all whom it may concern:*

Be it known that I, ELIHU THOMSON, a citizen of the United States, residing at Swampscott, county of Essex, State of Massachusetts, have invented certain new and useful Improvements in Meters for Recording the Measurements of Electric Power, of which the following is a specification.

My invention relates to meters for recording the measurements of electric power applied in any way, whether to the production of light or of mechanical energy, and has particular reference to what are commonly called "recording watt-meters," such as are described in my Patent No. 448,894; and has for its object to improve the construction of the meter therein described and adapt it for use upon the so-called "series-multiple" or "three-wire" system of distribution; and also to provide a means of adapting the meter to different potentials, so that I may use the same meter with a slight change in connections to register either between the two outside wires of the three-wire system or between one of such wires and the neutral or common return wire; at the same time so arranging the field-magnet coils of the meter that its torque is evenly distributed around the armature and thus in case one side only of the system is in use or in case one side is carrying a great preponderance of the current, the registration will still be correct, and will be effected without damage to the armature. To attain the ends pointed out, I arrange the field-magnet coils between the outside wires of the system and distribute them upon both sides of the armature; I preferably also arrange two independent sets of coils connected as hereinafter described, so that a part of each set is upon each side of the armature. The armature I arrange in shunt, with a resistance in series therewith; and I also preferably arrange a starting coil with just sufficient power to overcome the friction coefficient of the moving parts and in multiple with the armature and in series with the resistance, as described and claimed in my pending application, Serial No. 501,012, filed February 21, 1894.

The accompanying drawings show diagrammatic representations of my improved meter, in which—

Figure 1:
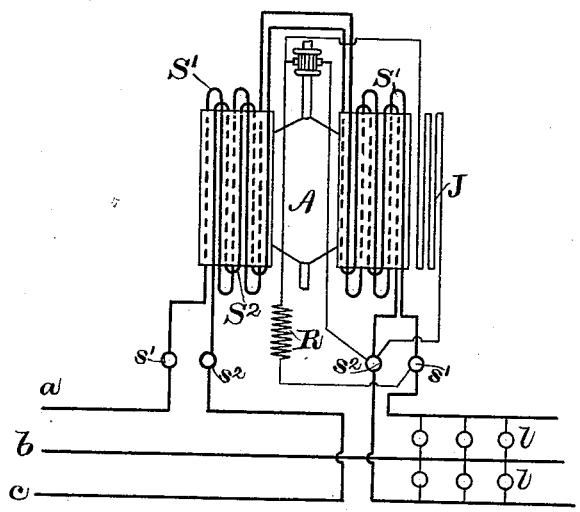
Figure 2:
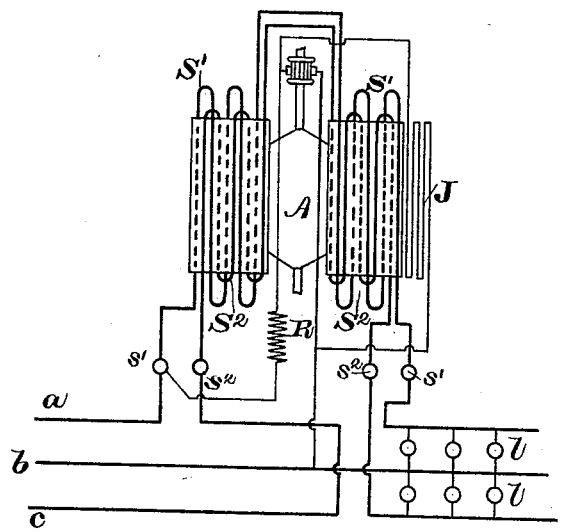

Figure 1 shows the connection of the armature in shunt across both the outside mains, while Fig. 2 shows it connected between one of the outer mains and the middle or neutral wire.

Referring by letter to the drawings, A is the armature of the meter motor constructed as in my patent referred to herein. S', S' and $S^2$, $S^2$ are series coils furnishing the field. The terminals of the respective coils are shown at $s'$, $s^2$, &c., and by tracing the circuit of these coils, it will be seen that they are divided so that one-half of each coil lies upon each side of the armature.

As already pointed out, each of the series coils is connected between the outer mains $a$, $c$ of the three-wire system supplying the lamps $l$, $l$. The armature however is connected in the case of Fig. 1 between the mains $a$, $c$, the neutral main $b$ having no connection with the meter, and in this case the meter works upon the maximum potential of the system, that is to say, in an ordinary lighting system, upon the two hundred and twenty volt potential commonly employed between the outer mains. In series with the armature is the resistance R, which, in accordance with the principles set out in my patent and pending application referred to, should be of rather large amount so that the current supplied to the armature will be sensibly constant or independent of the fluctuations of current in the mains, these fluctuations being utilized in the series coils S', $S^2$ to effect the registration of the number of watts supplied to the translating devices. In multiple with the armature is a starting coil J composed of fine resistance wire; as already referred to, this starting coil is of just sufficient capacity to overcome the friction of the moving parts and armature and permit it to turn upon very light loads, such as a single lamp. The arrangement in multiple also practically totally prevents sparking and the arrangement in series with the resistance is economical, dispensing with one resistance and at the same time assisting in keeping the current constant in the shunt circuit.

In Fig. 2 I illustrate the modification adapting the meter to register between one of the outer mains and the neutral, in which the armature, starting coil and the resistance, occupying the same relation to each other as in Fig. 1, are connected between one of the outer mains, in the case illustrated the main $a$, and the neutral wire $b$, thus adapting the meter to register upon the one hundred and ten volt current supplied between these mains in an ordinary lighting circuit. The other parts of Fig. 2 are arranged in substantially the same way as in Fig. 1.

The arrangement thus described of connecting series coils across the outer mains and disposing them symmetrically about the armature, having a part of each set of coils upon opposite sides thereof, furnishes a composite field of substantially equal magnetization in all of its parts, and adds greatly to the efficiency of the meter.

What I claim as new, and desire to secure by Letters Patent of the United States, is—

1. A recording watt-meter for the three-wire or series-multiple system, comprising an armature in shunt between the mains of such system and two sets of series coils furnishing the field, the sets symmetrically disposed so that some of the coils of each set are upon each side of the armature, thus furnishing a composite field of substantially equal intensity in all its parts.

2. A recording watt-meter for use upon the three-wire or series-multiple system, comprising a series of field-magnet coils arranged in sets, part of each set upon each side of the armature, an armature, a resistance, and a starting coil, the armature and starting coil being in multiple with each other and in series with the resistance, and all three being in shunt to the mains of the system.

3. A recording watt-meter for the three-wire or series-multiple system, comprising field-magnet coils connected across the outer mains of such system and disposed in sets, some of the coils of each set being upon opposite sides of the armature, an armature in shunt to the mains and a resistance in series with such armature.

4. A recording watt-meter for the three-wire or series-multiple system, comprising field-magnet coils connected across the outer mains of such system and disposed in sets, parts of each set being upon opposite sides of the armature, an armature, a starting coil and a resistance, the armature and starting coil being in multiple with each other and in series to the resistance, and all three being in shunt to the mains.

In witness whereof I have hereunto set my hand this 29th day of January, 1894.

ELIHU THOMSON.

Witnesses:
JOHN W. GIBBONEY,
BENJAMIN B. HULL.